United States Patent
Laackmann (10) Patent No.: US 8,918,610 B2
(45) Date of Patent: Dec. 23, 2014

(54) PROTECTION OF CHIPS AGAINST ATTACKS (75) Inventor: Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1399 days.

(21) Appl. No.: 11/007,591

(22) Filed: Dec. 8, 2004

(65) Prior Publication Data

US 2005/0141295 A1    Jun. 30, 2005

(30) Foreign Application Priority Data

Dec. 23, 2003  (DE) .................................. 103 60 998

(51) Int. Cl.
| | |
|---|---|
| *G06F 12/00* | (2006.01) |
| *G07F 7/10* | (2006.01) |
| *G07F 7/08* | (2006.01) |
| *G06Q 20/34* | (2012.01) |

(52) U.S. Cl.
CPC .............. *G07F 7/082* (2013.01); *G07F 7/1008* (2013.01); *G06Q 20/341* (2013.01)
USPC .................. 711/163; 711/114; 711/E12.091; 711/E12.092; 711/E12.093; 711/E12.094; 711/E12.095; 711/E12.096; 711/E12.097; 711/E12.098; 726/2; 726/16; 726/17; 726/18; 726/19; 726/20; 726/21

(58) Field of Classification Search
USPC ......................................................... 711/163
See application file for complete search history.

(56) References Cited

U.S. PATENT DOCUMENTS

| | | | | |
|---|---|---|---|---|
| 4,175,287 | A * | 11/1979 | Fuhrman .................... | 711/201 |
| 4,538,235 | A * | 8/1985 | Henning ..................... | 702/176 |
| 4,823,308 | A * | 4/1989 | Knight ........................ | 711/163 |
| 4,853,526 | A * | 8/1989 | Effing ......................... | 235/492 |
| 5,377,343 | A * | 12/1994 | Yaezawa ..................... | 711/164 |
| 5,406,624 | A * | 4/1995 | Tulpan ........................ | 713/192 |
| 5,570,201 | A * | 10/1996 | Yokota ........................ | 358/404 |
| 5,765,197 | A * | 6/1998 | Combs ........................ | 711/164 |
| 5,784,704 | A * | 7/1998 | Sanemitsu .................. | 711/164 |
| 6,002,619 | A * | 12/1999 | Gaultier ...................... | 365/195 |
| 6,286,087 | B1 * | 9/2001 | Ito et al. ..................... | 711/164 |
| 6,381,686 | B1 * | 4/2002 | Imamura ..................... | 711/203 |
| 6,463,512 | B2 * | 10/2002 | Isemura et al. ............. | 711/160 |

(Continued)

FOREIGN PATENT DOCUMENTS

| | | |
|---|---|---|
| DE | 36 38 505 C2 | 5/1988 |
| DE | 198 31 884 A1 | 1/2000 |

(Continued)

OTHER PUBLICATIONS

Worldstart.com, "Tip #1391—What's Your "Uptime" ", pp. 2 http://www.worldstart.com/tips/tips.php/1391.*

(Continued)

*Primary Examiner* — Edward Dudek, Jr.
*Assistant Examiner* — Christopher Birkhimer
(74) *Attorney, Agent, or Firm* — Schiff Hardin LLP (57) ABSTRACT

A chip including a processor for performing a predetermined operation, a provider for providing a clock signal, with which the processor is clocked, a counter for decrementing or incrementing a count based on the clock signal, a monitor for signaling the predetermined operation to be prevented, depending on the count, and a non-volatile storage for non-volatily storing the count.

34 Claims, 4 Drawing Sheets

(56) References Cited

U.S. PATENT DOCUMENTS

| | | | |
|---|---|---|---|
| 6,490,667 B1 * | 12/2002 | Ikeda | 711/163 |
| 6,611,773 B2 * | 8/2003 | Przydatek et al. | 702/62 |
| 6,711,685 B1 | 3/2004 | Schaal et al. | |
| 6,904,514 B1 * | 6/2005 | Sato | 712/212 |
| 2002/0049893 A1 * | 4/2002 | Williams et al. | 712/11 |
| 2002/0124183 A1 | 9/2002 | Marinet et al. | |
| 2003/0218896 A1 * | 11/2003 | Pon et al. | 365/63 |

FOREIGN PATENT DOCUMENTS

| | | |
|---|---|---|
| EP | 0 314 148 A2 | 5/1989 |
| EP | 0 314 148 A3 | 5/1989 |
| EP | 0 614 159 A1 | 9/1994 |
| FR | 2 786 007 A1 | 5/2000 |
| WO | WO-02/09347 A1 | 1/2002 |

OTHER PUBLICATIONS

WordNet, ("WordNet Search—3.0"), pp. 1, http://wordnetweb.princeton.edu/perl/webwn?s=any.*

Astorrs, ("How to Restrict Login Time/Duration"), Apr. 23, 2003, pp. 1-4, http://www.anetforums.com/posts.aspx?ThreadIndex=19092.*

STMicroelectronics, ("Glossary: U"), Nov. 9, 2002, pp. 1-3, http://web.archive.org/web/20021109091640/http://www.st.com/stonline/press/news/glossary/u.htm.*

* cited by examiner

PROTECTION OF CHIPS AGAINST ATTACKS

CROSS-REFERENCE TO RELATED APPLICATION

This application claims priority from German Patent Application No. 10360998.9, which was filed on Dec. 23, 2003 and is incorporated herein by reference in its entirety.

BACKGROUND OF THE INVENTION

1. Field of the Invention

The present invention relates to chips, and more particularly to protection of chips to prevent unlimited access to the same.

2. Description of the Related Art

The protection concepts of current chips are designed such that they determine only the number of authentification attempts and authentifications, respectively. In the present application, chips mean a semiconductor apparatus with integrated circuitry, while chip cards consist of the chip and a carrier, such as a plastic carrier. In a current GSM SIM card, for example, the number of potential authentification attempts is limited to three. A program in a processing unit in a GSM SIM card determines the number of authentification attempts via a counter and compares whether the count exceeds the maximum value. If this is the case, the card is locked.

Figure 6:
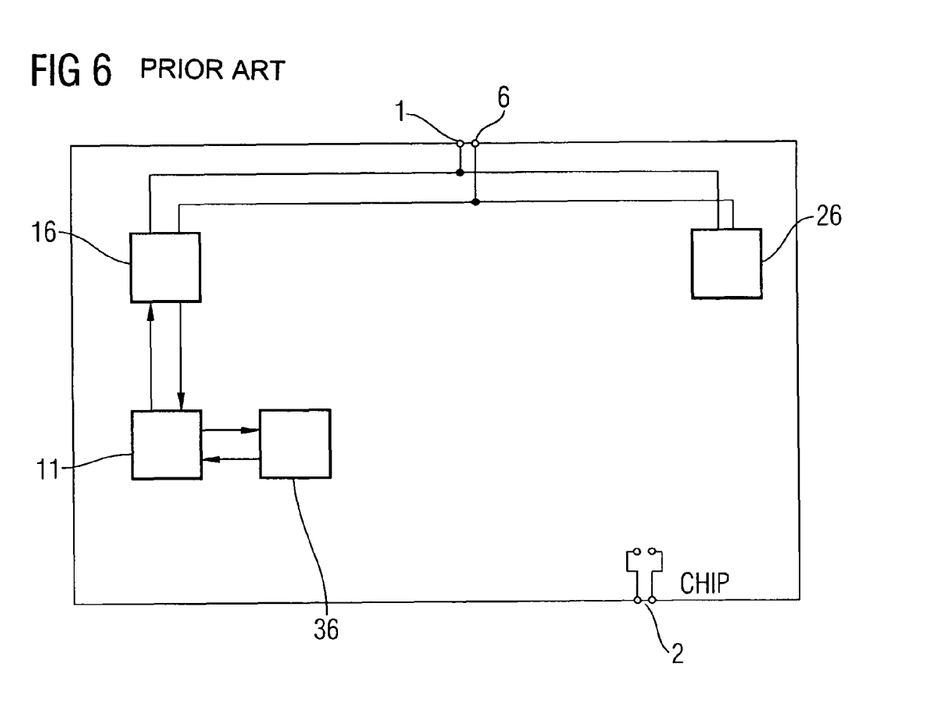
FIG. 6 is a block diagram of a conventional chip.

FIG. 6 shows such a GSM SIM card. It comprises a clock terminal 1, a supply voltage terminal 2, a data bus terminal 6, a processing unit 16, a memory 26, a counter 11 and a non-volatile memory 36. The clock terminal 1 and the data bus terminal 6 are connected to the processing unit 16 and the memory 26. An output of the processing unit 16 is connected to the input of the counter 11, an output of the counter 11 is connected to an input of the processing unit 16. Thus, there is a bidirectional connection between the processing unit 16 and the counter 11. A further output of the counter is connected to the input of a non-volatile memory 36 and an output of the non-volatile memory 36 to an input of the counter 11. Thus, there is again a bidirectional connection between the counter 11 and the non-volatile memory 36. The processing unit 16 is suitable for performing operations. These operations can be reading out contents of the memory 26, processing these contents and the subsequent writing of contents into the memory 26. Depending on a certain instruction or certain instructions for instructing an authentification attempt, the processing unit signals the counter to increment its count by one. The counter 11 stores its current count in the non-volatile memory 36. If the supply voltage is switched off at the supply voltage terminal 2, the non-volatile memory 36 retains the last state of the counter 11. If a supply voltage is applied again to the supply voltage terminal 2, the counter 11 reads its output count from the non-volatile memory 36 before it can receive further signals from the processing unit 16. If the counter 11 reaches a certain value, such as 3, a certain access method to the chip, which means further authentification attempts via the input of a four digit identification number (PIN number), is prevented. Thus, the GSM SIM card allows no further authentification attempts this way. The chip can then only be unlocked via the input of a very long identification number, which the customer receives from the mobile radio operator when signing a contract.

However, this method does not prevent a potential attacker from performing current analysis, spike attacks and similar attacks to the chip across an unlimited time or across an unlimited number of clock cycles. By these methods, the potential attacker can obtain valuable information about the construction, the structure and content of the memory elements on the chip and thus acquire secret data. For these attacks, an authentification is not required, which is why the protection mechanism fails.

The problem with trying to prevent further attacks, which require no authentification, is that current chip testers with microcontrollers and security memories such as a smart card, have no clock, so that the operation cannot be limited in time. There is no time reference for detecting the time period within which an attacker tries to obtain information via the chip.

So far, the time coupling was only implemented in security models, typically in remote access applications, such as access authorization modules for firm means such as for secure token with a real time clock, which requires battery buffering and a quartz clock generation. Due to their thickness, these elements cannot be used in the chip cards widely spread today.

SUMMARY OF THE INVENTION

It is an object of the present invention to provide a chip, so that operating the chip in a manner unlimited in time is impeded.

In accordance with a first aspect, the present invention provides a chip, having a processing unit for performing a predetermined operation; a provider for providing a clock signal with which the processing means is clocked; a counter for decrementing or incrementing a count based on the clock signal; and a monitor for signaling that the predetermined operation is to be prevented, depending on the count.

In accordance with a second aspect, the present invention provides a method for controlling a chip having a processor for performing a predetermined operation, the method having the steps of providing a clock signal with which the processor is clocked; decrementing or incrementing a count in response to the clock signal; and signaling that the predetermined operation is to be prevented, depending on the count.

In accordance with a third aspect, the present invention provides a method for controlling a chip having a processor for performing a predetermined operation, the method having the steps of providing a clock signal, with which the processing means is clocked; decrementing or incrementing the count in response to the clock signal; and non-volatily storing the count.

It is a central idea of the present invention to use a clock signal provided to a processor of the chip for time reference, by a counter decrementing or incrementing a count in response to this clock signal. If the count fulfills a predetermined condition, a corresponding unit on the chip can signal that this value has been achieved and exceeded, respectively, so that the chip no longer performs this operation. Or the count is always stored in a non-volatile way so that this value can be read out, for example, from an external device to test whether it is still allowed to operate the chip. The clock signal that is used can be generated by an external device, such as a terminal, or derived from the same.

It is an advantage of the present invention that thereby a chip has a time reference and clock number reference, respectively, which allows a processing means or an external device communicating with the same to prevent a predetermined operation when a certain time and number of counts, respectively, is exceeded.

If the count is stored in a non-volatile memory, this allows the processor additionally to prevent certain operations depending on a previous history of the chip, which are prior to the last and current, respectively, start-up and the supply of the chip with operating voltage connected therewith.

Particularly, in the case of the non-volatile memory, the chip would be able to store information about the duration of potential attacks and signal these to an external device. This enables, for example, prevention of the usage of chip cards beyond a certain operating time.

Additionally, in the case of the non-volatile memory and the communication with an external device, such as a terminal, the tracking of the manipulation of chip cards can be made easier. If, for example, a criminal manipulates a chip after long tests and analysis in that way that it is illegally charged with additional amounts of money, the terminal, such as a cash register in a shop, can read out this information about the length of the tests and analysis when the card is used and transmit them to the police for convicting the criminal.

Above that, when the chip is continually clocked in a set top box, the present invention provides the possibility of preventing predetermined operations after the expiration of a defined operating time. Thereby, chip cards can be produced which lock the reception of programs after the expiration of a fixed time period, such as Pay-TV cards.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
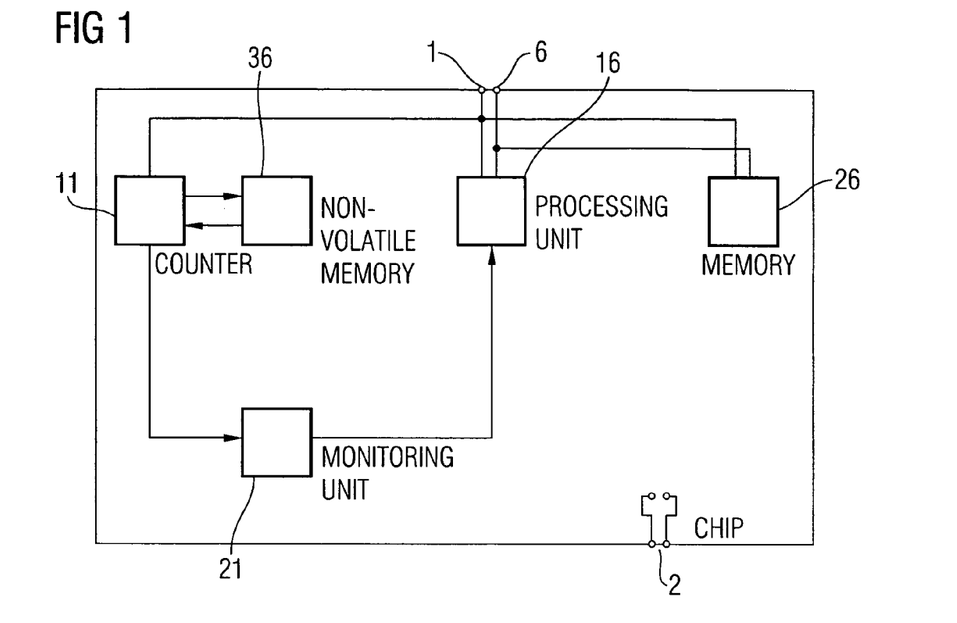
FIG. 1 is a block diagram of a chip according to an embodiment of the present invention.

FIG. 1 shows a block diagram of a chip according to an embodiment of the present invention. The block diagram comprises a clock terminal 1, a supply voltage terminal 2, a data bus terminal 6, a counter 11, a non-volatile memory 36, a processing unit 16, a memory 26 and a monitor unit 21. The clock terminal 1 is connected to an input of the counter 11, an input of the processing unit 16 and an input of the memory 26.

The data terminal 6 is connected to the processing unit 16 or the memory 26, wherein the connection can be made via a processing data bus, which is either in the form of a line or in the form of several lines. These lines can then be divided into lines for addresses and/or data and/or chip select and/or instruction signals, for example. The data bus terminal 6 is connected to the processing unit 16 and to the memory 26. An output of the counter 11 is connected to an input of the non-volatile memory 36, while an output of the non-volatile memory 36 is connected to an input of the counter 11. Thus, there is a bidirectional connection between the counter 11 and the non-volatile memory 36. A further output of the counter 11 is connected to an input of the monitoring unit 21. The output of the monitoring unit 21 is applied to an input of the processing unit 16.

Of course, the chip can contain any number of further units, such as further processing units, further memory units or an arbitrary number of circuit modules (A/D transducers, comparators etc.). These can of course be connected to the clock terminal 1 and the data bus terminal 6. Additionally, the monitoring unit 21 can be integrated in the processing unit 16 or the processing unit 16 can take over its functionality. The non-volatile memory 36 can of course also be integrated in the memory 26, when the same is embodied in a non-volatile way. The clock terminal 1 and the data bus terminal 6 serve as external terminals for communication with an external device, such as a terminal, to obtain clock signals and data from the same and to supply data to the same. They can be embodied as contact interface, when the chip is a circuit module in a contact less chip card.

A clock signal or a predetermined clock sequence at the clock terminal 1 clocks the processing unit 16 and the memory 26. These communicate via the data bus either with one another, wherein the processing unit 16 reads out data from the memory 26, process and stores them again in memory 26, or an external device communicates via the data terminal 6 with the processing unit 16 or via the data bus with the memory 26. Of course, the processing unit 16 can also execute certain instructions in response to the data received from an external device, or can direct an external device to execute certain instructions. Thus, an external device can obtain information about the data and the memory 26, eventually change them or write new data in the memory 26. A clock signal at the clock terminal 1 increments or decrements the count of a counter 11 with every clock pulse. The count of the counter 11 is passed on to a non-volatile memory 36 and a monitoring unit 21 in predetermined intervals, such as after expiration of a predetermined number of clocks. It is the object of the non-volatile memory 36 to maintain this count even when switching off the supply voltage at the supply voltage terminal 2 of the chip in this embodiment. If the voltage at the supply voltage terminal 2 for the chip in this embodiment is switched off, the non-volatile memory 36 maintains the current count. If subsequently the supply voltage at the supply voltage terminal 2 is applied again, the counter 11 reads first the count from the non-volatile memory 36 into its internal registers (not shown). Then, it begins to further decrement or increment its count with this value in dependence on the pulses at the clock terminal 1. Thus, the non-volatile memory 36 enables the count of the counter 11 to always depend on the total number of clock pulses applied to the control terminal 1 across the whole operating period, independent of whether the supply voltage has been switched off or not. The count of the counter 11 is passed on to the monitoring unit 21, which monitors overshoot or undershoot of a certain value through the count and communicates a signal to the processing unit 16 in the case of overshoot or undershoot. The processing unit 16 logs this signal and prevents, if the same is logged, one or several certain operations, which the processing unit 16 can execute, and which could otherwise be executed by the same. These determined operations could be operations, which are not necessarily executed by the processing unit alone, but for example also in accesses to the memory unit 26 or in cooperation with other circuit modules.

If an attacker tries to obtain information about the construction, the structure, the circuit elements or the data on the chip in a test laboratory, such as in a DPA differential power analysis, the clocking of the chip at the clock terminal 1 across a time period is required. This time period of testing and analysis is typically long in relation to the time period in which the chip is normally operated. The counter 11 further logs these clocks at the clock terminal 1 during the testing and analyzing of the chip by an attacker. From a certain value of the counter 11 onwards, the monitoring unit 21 realizes that a critical threshold has been overshot or undershot. It signals this state to the processing unit 16. Thereby, the processing unit 16 realizes that an attack on the chip has taken place and prevents further predetermined operations on the chip. Even when the attacker switches off the supply voltage, the last state of the counter 11 is stored in the non-volatile memory 36. The counter begins then to further decrement or increment its count with this stored value. An attacker can thus not bypass the protection mechanism of the counter 11 by switching off the supply voltage. Thus, after the expiration of a predetermined number of clock cycles at the clock terminal 1, which again corresponds to a determined operating period of chip, the chip can prevent the operations, such as security critical operations, debit functions, cryptographical algorithms, authentifications and operations at secret data performed by the processing unit 16. This protects the chip from manipulations by an attacker, which has obtained information about the construction, structure and circuit modules and/or the stored data on a chip in a test laboratory over a typically long time period compared to the operating period of the chip.

Figure 2:
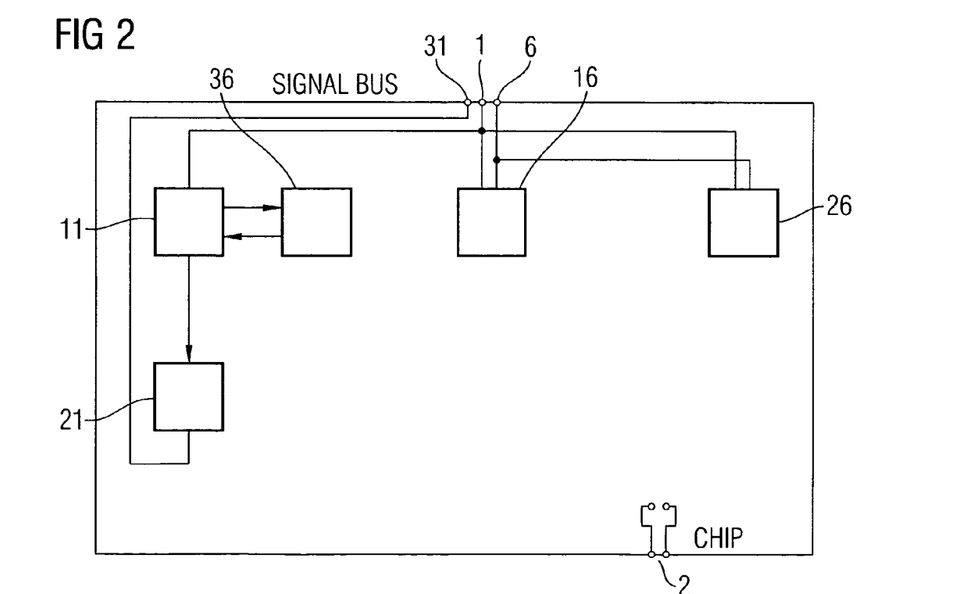
FIG. 2 is a block diagram of a chip according to an embodiment of the present invention.

In a further embodiment according to FIG. 2, contrary to the embodiment of FIG. 1, an output or several outputs of the monitoring unit 21 are applied to a signal bus terminal 31. The difference from the embodiment of FIG. 1 is that the monitoring unit 21 communicates with an external device via the signal bus terminal 31 to signal the same undershoot or overshoot of a predetermined count. The external device can, for example, be an automated teller machine, a card reader at a department store, cash register, or a public telephone which are informed about the operating period of the chip and thus about potential manipulations at the same. They can then prevent operations such as using the telephone or withdrawing money and above that provide the police with data about the manipulation at the chip.

Figure 3:
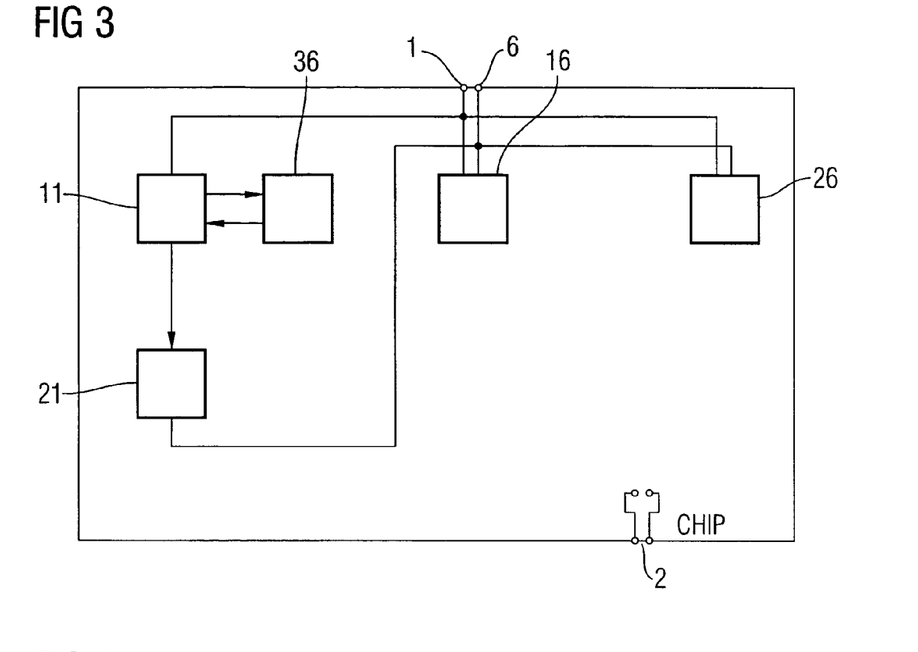
FIG. 3 is a block diagram of a chip according to an embodiment of the present invention.

In a further embodiment according to FIG. 3, in contrast to FIG. 2, the output signal of the monitoring unit 21 is applied at least partly to the data bus terminal 6. In that way, the monitoring unit 21 can send information to the processing unit 16, the memory 26 or an external device, such as an automated teller machine. These communications can of course also be performed bidirectionally, and the processing unit 16 could then request predetermined values or information from the monitoring unit 21, such as the count. Based on the signals or information from the monitoring unit 21, the processing unit 16 or an external device can prevent predefined operations. Of course, information coming from the monitoring unit can first be stored in the memory 26 and read out therefrom by the processing unit 16 on an external device. Thus, the processing unit 16 or an external device obtain information about the data bus via the data bus terminal 6 about the operating period and the number of clocks, respectively, which were applied to the chip across its whole life span independent of switching on and off the supply voltage. Again, for example, an automated teller machine, if it is the external device, can withhold the card after an excessively long operating period of chip, which can probably be attributed to a manipulation and an attempted manipulation, respectively. A further case for application is possible, in that the processing unit 16 already prevents reading of secret data, such as encrypted identification numbers in a GSM card upon signaling this excessively high operating period. A further advantage of the embodiment according to FIG. 3 compared to the embodiment according to FIG. 2 is when the chip is used in so-called contactless cards. In those, there is no possibility to lead out the signal bus across a further terminal.

The processing unit 16 on a chip, which has been designed as a security processing unit and reads out its program from the memory 26, can, for example, query the count via the monitoring unit 21 and store the value of the run time up to now in regular intervals in the memory 26, which is non-volatile in this case. Here, it is advantageous to select intervals, which place no excessive load on the memory, such as minutes or hours. Depending on the application, the maximum values of the operating period can be chosen freely. One application would be a Pay-TV card with a chip as in FIG. 3 with a fixed lifetime. The card is constantly supplied with a clock signal and current in the set top box; after, for example, one year, the card is automatically locked.

Figure 4:
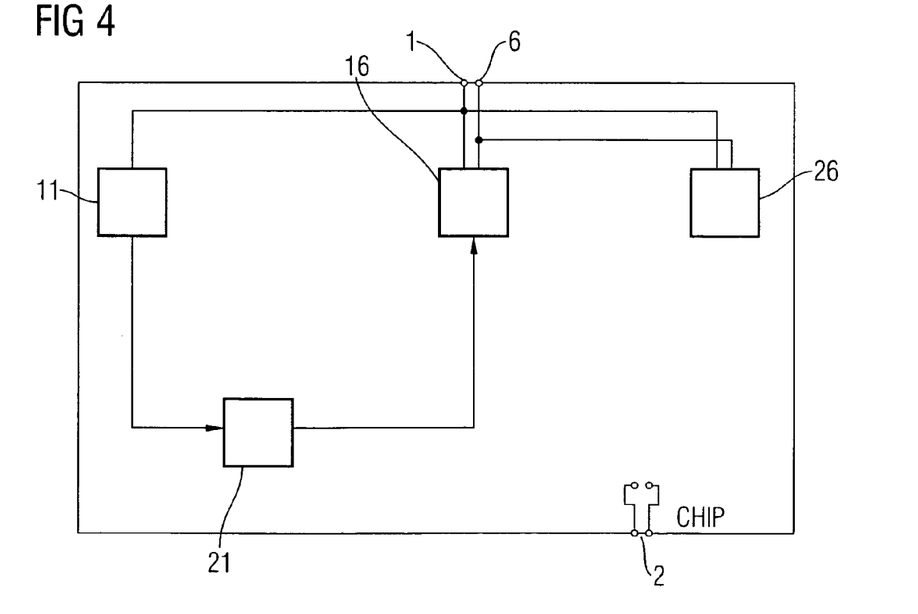
FIG. 4 is a block diagram of a chip according to an embodiment of the present invention.

In an embodiment according to FIG. 4, the non-volatile memory 36 is omitted in contrast to FIG. 1. The monitoring unit 21 monitors the count 11 and signals the processing unit 16 when a predefined value is overshot or undershot. Thereupon, the processing unit 16 prevents again predefined operations. One case of application for this embodiment could be a disposable card for a Pay-TV program, which enables, for example, a once-off view of a film for two hours. In this arrangement, all information about events taken place prior to applying the supply voltage to the chip is lost. Omitting the non-volatile memory allows the chip to do without writable non-volatile memory technologies and thus reduce the costs for the production process.

Figure 5:
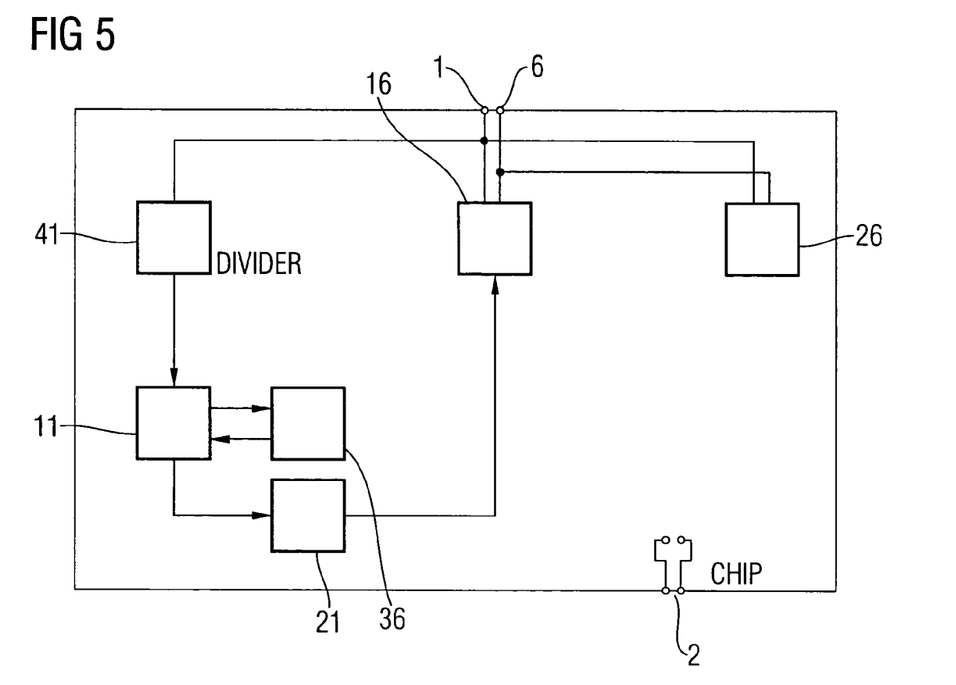
FIG. 5 is a block diagram of a chip according to an embodiment of the present invention.

FIG. 5 illustrates the block diagram of a chip according to a further embodiment of the present invention. In contrast to FIG. 1, this figure comprises a divider 41, which is applied to the clock terminal 1 and sends its output signal to the counter 11. After a sequence of N clocks, the divider 41 generates a clock signal for the counter 11. The counter determines the number of clocks at its output and transmits those to the monitoring unit 21. If the monitoring unit 21 determines that the count overshoots or undershoots a determined value, it directs the processing unit 16 to prevent determined operations. Here, a configuration is possible where, for example, a determined divider factor N is set by the processing unit 16 in the divider 41. It is advantageous when this division factor is not altered during the operation. Inserting the divider 41 can reduce the complexity of the counter 11 and the non-volatile memory 36 significantly. Then, the non-volatile memory 36 only has to store a significantly lower number of clock cycles of the counter 11 and requires significantly less memory cells.

Thereby, the operating period of a telephone card can be limited. Since it is a synchronous card, the number of maximum clock cycles plus security value is exactly known, if the card is operated in a pocket reader. The clock signals are supplied to the divider in the chip, which sends a signal to the counter 11 after N clock cycles, which again decrements its count and stores the new value in the non-volatile memory. If the count is zero, the chip on the card can no longer be used for paying the fees. The unit fees can still be read, but are no longer valid.

The above embodiments show how a chip utilizes the clock signal applied from the outside for measuring the operating time of the card. Via a clock divider, the clock signals are divided into usable time units, which are permanently stored in regular intervals (N clocks) in the memory of the chip card. Thus, no additional components are required.

In these embodiments, it is explained how the measurement of the expired clock signals or clock cycles is performed via a counter (advantageous in so-called secure memories) or timer (advantageous in security controllers) and the cumulative storage of the time information of the non-volatile memory of the card acquired that way.

One example for the application of the principles discussed in the embodiments in a memory card is a telephone card where the operating period is to be limited. Since it is a synchronous card, the number of maximum clock cycles plus security value (if operated in the pocket card reader, etc.) is exactly known. The clock signals and clock cycles, respectively, are supplied to a counter in the card, which triggers a decrement of a non-volatile memory value after "N" clock cycles. If the memory value is zero, the card can no longer be used. The unit fees can still be read, but are no longer valid.

A further example for using the principles discussed in the embodiments is a chip card provided with a security controller, which is equipped with a timer. A resident program (in the ROM) of the controller queries the timer and stores the value of the run time up to now in regular intervals in the non-volatile memory.

The processing unit 16 can, for example, be designed as processor core or as logic. Although above the means for providing the clock was an external clock terminal, the same can instead be embodied by an oscillator formed internally in the chip. The non-volatile memory can also exist in form of an EEPROM or a flash memory. Additionally, for preventing the determined operations, security data can also be deleted.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A chip, comprising:
   a processor configured to perform a predetermined operation;
   a provider configured to provide a clock signal with which the processor is clocked;
   a counter configured to decrement or increment a count based on the clock signal, wherein starting the decrementing or incrementing is independent from a state of the processor; and
   a monitor configured to signal that the predetermined operation is to be prevented, if the count reaches a predetermined value,
   wherein the chip is configured such that the count inevitably increases or decreases monotonically during the time the chip is powered so that the count is a measure of the time the chip is powered, and a time duration the processor is not prevented from performing the predetermined operation is limited irrespective of any-bit sequences input into the chip during that time duration.

2. The chip according to claim 1, further comprising a clock divider configured to generate a divided clock signal, wherein the counter is formed to perform the decrementing or incrementing in response to the divided clock signal.

3. The chip according to claim 1, further comprising a processor core configured to signal depending on the count.

4. A chip card with a chip according to claim 1.

5. The chip according to claim 1, wherein the processor carries out no further performances of the predetermined operation when the monitor signals that the predetermined operation is to be prevented.

6. The method according to claim 5, wherein the predetermined operation comprises a cryptographical algorithm or an operation at secret data.

7. The chip according to claim 1, wherein the monitor is configured to perform the signaling independently from a state of the processor, that the operation is to be prevented.

8. The chip according to claim 1, wherein the counter is configured to perform the decrementing or incrementing independently from a state of the processor.

9. The chip according to claim 1, wherein the counter is configured to decrement or increment the count based on the clock signal such that the count depends on a number of clock pulses of the clock signal occurring from a time at which the decrementing or incrementing is started.

10. The chip according to claim 9, wherein the counter is configured to start the decrementing or incrementing at a time power is applied to the processor, such that the count depends on a number of clock pulses of the clock signal occurring from that time on.

11. The chip according to claim 9, wherein the counter is configured to start the decrementing or incrementing at a time power is applied to the processor, such that the count depends on a total number of clock pulses of the clock signal applied to the processor, independent of the appliance of the power to the processor being interrupted or not.

12. A chip, comprising:
    a processor configured to perform a predetermined operation;
    a provider configured to provide a clock signal, with which the processor is clocked;
    a counter configured to decrement or increment a count based on the clock signal, wherein starting the decrementing or incrementing is independent from a state of the processor;
    a non-volatile storage configured to store the count so that the counter monotonically increases or decreases the count when the chip is powered, and the count is maintained across time periods the chip is non-powered, and so that the count is indicative of a total time the chip is powered since a first powering of the chip; and
    a monitor configured to signal that the predetermined operation is to be prevented, depending on the count.

13. The chip according to claim 12, wherein the monitor is connected to an external device via a data bus terminal.

14. The chip according to claim 12, wherein the monitor is connected to the processor via a data bus terminal.

15. The chip according to claim 12, wherein the predetermined operation comprises a cryptographical algorithm or an operation at secret data.

16. The chip according to claim 12, further comprising a second storage spaced apart from the non-volatile storage, wherein the processor is configured to read out or store data in the second storage.

17. The chip according to claim 16, wherein the second storage comprises a non-volatile storage area.

18. The chip according to claim 16, wherein the second storage comprises a volatile storage area.

19. The chip according to claim 16, wherein the counter is configured to perform the decrementing or incrementing independently from a state of the processor.

20. The chip according to claim 17, wherein the second storage comprises a volatile storage area.

21. The chip according to claim 12, further comprising a clock divider configured to generate a divided clock signal, wherein the counter is configured to perform the decrementing or incrementing in response to the divided clock signal.

22. The chip according to claim 12, further comprising a processor core configured to signal depending on the count.

23. A chip card with a chip according to claim 12.

24. The chip according to claim 12, wherein the counter is configured to perform the decrementing or incrementing independently from a state of the processor.

25. The chip according to claim 12, wherein the counter is configured to decrement or increment the count based on the clock signal such that the count depends on a number of clock pulses of the clock signal occurring from a time at which the decrementing or incrementing is started.

26. A method for controlling a chip comprising a processor for performing a predetermined operation, the method comprising:
providing a clock signal with which the processor is clocked;
decrementing or incrementing a count in response to the clock signal, wherein starting the decrementing or incrementing is independent from a state of the processor; and
signaling that the predetermined operation is to be prevented, if the count reaches a predetermined value,
wherein the signaling and the decrementing or incrementing are performed such that the count inevitably increases or decreases monotonically during the time the chip is powered so that the count is a measure of a time duration the chip is powered, and the time the processor is not prevented from performing the predetermined operation is limited irrespective of bit sequences input into the chip during that time duration.

27. The method according to claim 26, further comprising no longer carrying out further performances of the predetermined operation after signaling that the predetermined operation is to be prevented, wherein the predetermined operation comprises a cryptographical algorithm or an operation at secret data.

28. The method according to claim 26, wherein the signaling that the predetermined operation is to be prevented, is performed independently from a state of the processor.

29. A method for controlling a chip comprising a processor for performing a predetermined operation, the method comprising:
providing a clock signal, with which the processor is clocked;
decrementing or incrementing a count in response to the clock signal, wherein starting the decrementing or incrementing is independent from a state of the processor;
storing the count in a non-volatile manner so that the count monotonically increases or decreases when the chip is powered, and the count is maintained across time periods the chip is non-powered, and so that the count is indicative of a total time the chip is powered since a first powering of the chip; and
signaling that the predetermined operation is to be prevented, depending on the count.

30. The method according to claim 29, further comprising:
storing the count in a non-volatile storage for non-volatile storing; and
reading out data or storing data in a second storage, which is spaced apart from the non-volatile storage for storing the count, by the processor.

31. A chip, comprising:
a processor configured to perform a predetermined operation using power applied to the processor;
a provider configured to provide a clock signal with which the processor is clocked;
a counter configured to decrement or increment a count based on the clock signal, with starting the decrementing or incrementing at the time power is applied to the processor, such that the count monotonically increases or decreases with consecutive clock pulses of the clock signal occurring from the time power is applied to the processor, and the count is a measure of a time duration power is applied to the processor; and
a monitor configured to signal that the predetermined operation is to be prevented, if the count reaches a predetermined value such that the time duration the processor is not prevented from performing the predetermined operation is limited irrespective of bit sequences input into the chip during that time duration.

32. A chip, comprising:
a processor configured to perform a predetermined operation using power applied to the processor;
a provider configured to provide a clock signal, with which the processor is clocked;
a counter configured to decrement or increment a count based on the clock signal, with starting the decrementing or incrementing at the time power is applied to the processor, such that the count monotonically increases or decreases with consecutive clock pulses of the clock signal occurring from the time power is applied to the processor;
a non-volatile storage configured to store the count so that the count monotonically increases or decreases when the chip is powered, and the count is maintained across time periods no power is applied to the processor, and so that the count is indicative of a total time the power is supplied to the processor, since a first application of power to the processor; and
a monitor configured to signal that the predetermined operation is to be prevented, if the count reaches a predetermined value.

33. A method for controlling a chip comprising a processor for performing a predetermined operation using power applied to the processor, the method comprising:
providing a clock signal with which the processor is clocked;
decrementing or incrementing a count in response to the clock signal, with starting the decrementing or incrementing at the time power is applied to the processor, such that the count depends on a number of clock pulses of the clock signal occurring from the time power is applied to the processor and the count is a measure of the time power is applied to the processor; and
signaling that the predetermined operation is to be prevented, if the count reaches a predetermined value such that a time duration the processor is not prevented from performing the predetermined operation is limited irrespective of bit sequences input into the chip during that time duration.

34. A method for controlling a chip comprising a processor for performing a predetermined operation using power applied to the processor, the method comprising:
providing a clock signal, with which the processor is clocked;
decrementing or incrementing a count in response to the clock signal, with starting the decrementing or incrementing at the time power is applied to the processor, such that the count depends on a number of clock pulses of the clock signal occurring from the time power is applied to the processor;
storing the count in a non-volatile manner so that the count monotonically increases or decreases when the chip is powered, and the count is maintained across time periods no power is applied to the processor, and so that the count is indicative of a total time the power is supplied to the processor, since a first application of power to the processor; and signaling that the predetermined operation is to be prevented, if the count reaches a predetermined value.

* * * * *